United States Patent [19]

Drozd

[11] 4,333,194
[45] Jun. 8, 1982

[54] AIRCRAFT LOADER WITH REVOLVING CAB

[75] Inventor: Otto Drozd, Hialeah, Fla.

[73] Assignee: Wollard Aircraft Equipment, Inc., Miami, Fla.

[21] Appl. No.: 206,283

[22] Filed: Nov. 12, 1980

[51] Int. Cl.$^3$ .............................................. E01D 1/00
[52] U.S. Cl. ..................................................... 14/71.5
[58] Field of Search .............................. 14/71.5, 71.3

[56] References Cited

U.S. PATENT DOCUMENTS

| | | | |
|---|---|---|---|
| 2,875,457 | 3/1959 | Read | 14/71.5 |
| 3,060,471 | 10/1962 | Der Yuen | 14/71.5 |
| 3,110,048 | 11/1963 | Bolton | 14/71.5 |
| 3,123,167 | 3/1964 | Lichti | 14/71.5 |
| 3,184,772 | 5/1965 | Moore | 14/71.5 |
| 3,263,253 | 8/1966 | Wollard | 14/71.5 |
| 3,263,254 | 8/1966 | Wollard | 14/71.5 |
| 3,315,291 | 4/1967 | Wollard | 14/71.5 |
| 3,402,412 | 9/1968 | Seipo | 14/71.5 |
| 3,412,412 | 11/1968 | Kjerulf | 14/71.5 |
| 3,422,477 | 1/1969 | Riggles | 14/71.5 |
| 3,561,030 | 2/1971 | Seipos | 14/71.5 |
| 3,606,626 | 9/1971 | Eggert | 14/71.5 |
| 3,699,600 | 10/1972 | Gacs | 14/71.5 |

*Primary Examiner*—Nile C. Byers, Jr.
*Attorney, Agent, or Firm*—Shanley, O'Neil and Baker

[57] ABSTRACT

A passenger conveyance vehicle loading and unloading ramp has one end pivotally supported adjacent a terminal building and the other end supported for movement into and away from a loading position at a vehicle door includes an enlarged generally cylindrical head mounted adjacent the outer end of the ramp for limited pivotal movement about a horizontal axis extending transversely of the longitudinal axis of the ramp, and a cab or vestibule mounted on the enlarged head for movement therewith and for pivotal movement about a generaly vertical axis for contact with the vehicle throughout a wide range of angles between the longitudinal axes of the ramp and of the conveyance vehicle. The vestibule is supported entirely from its bottom portion whereby the vestibule structure may be relatively lightweight since only minimal loads will have to be transferred between the top and bottom of the vestibule structure.

10 Claims, 7 Drawing Figures

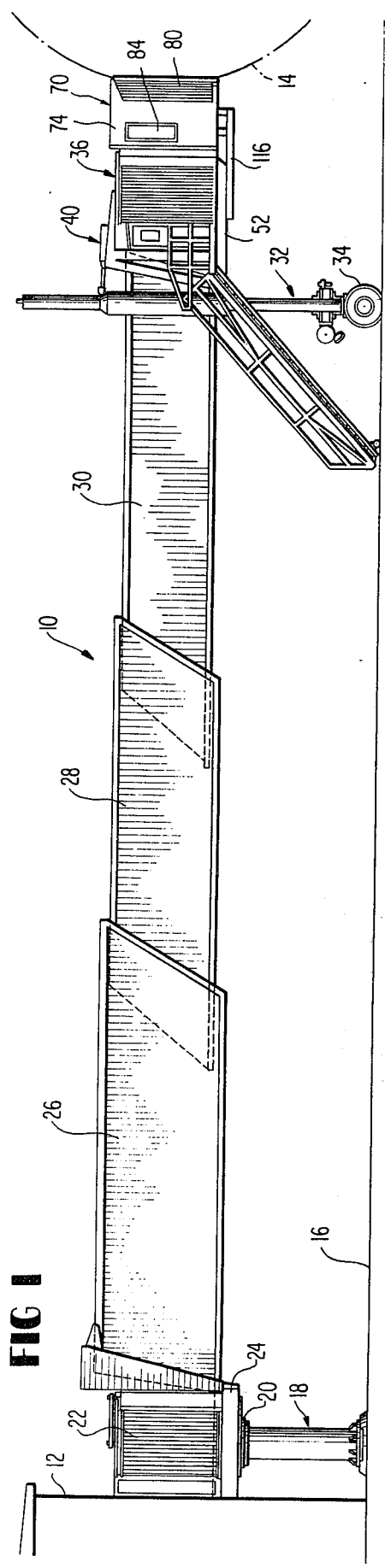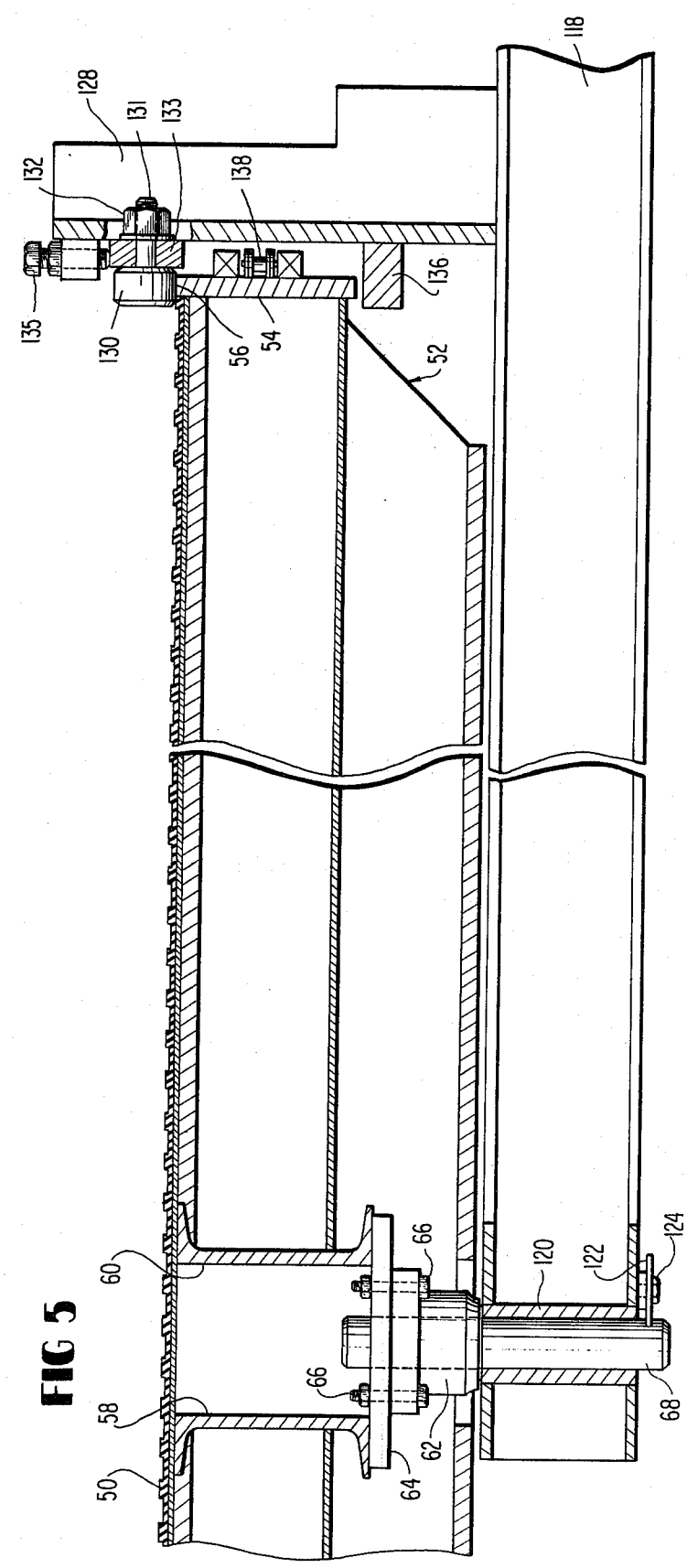

AIRCRAFT LOADER WITH REVOLVING CAB

BACKGROUND OF THE INVENTION

1. Field of the Invention

This invention relates to passenger vehicle loading ramps having a pivotally mounted cab or vestibule on its outer movable end, and more particularly to an improved mounting means for supporting a vestibule on the outer end of such ramps for pivotal movement throughout a wide angle to accommodate conveyance vehicles disposed at a wide range of angles relative to the longitudinal axis of the ramp.

2. Description of the Prior Art

Conveyance loading ramps of the type employed to provide an enclosed passageway bridging the space between a terminal building and a conveyance vehicle are commonly made up of a plurality of telescoping tunnel sections which are relatively movable to extend and retract the ramp as necessary to position the open end of the passageway adjacent an open door in a conveyance vehicle which may be located at various distances from and at different orientations relative to the terminal building. Such loading ramps are most commonly employed in connection with the loading and unloading of passengers onto and from airplanes and the invention will be described herein with respect to such apparatus, it being understood that the invention could also be employed in connection with ramps used with other conveyance vehicles.

Known aircraft loading ramps normally have one end pivotally mounted on a fixed support at the terminal building and the other end supported on an undercarriage, sometimes referred to as a buggy, having wheels which are driven to extend and retract the ramp steered to enable driving the outer end of the ramp to and from a loading position adjacent an aircraft door. However, since the ramps are employed to load and unload various types of aircraft, and since the aircraft are not always parked on the same bearing or at the same location on the apron, it is generally necessary to make special provisions for engaging the airplane at an angle enabling the open end of the tunnel bridge to form a generally weathertight seal with the airplane around the door opening. This is accomplished by providing means for raising and lowering the outer, movable end of the bridge and by providing an aircraft vestibule mounted on such outer end for limited horizontal swinging movement about a vertical axis to enable the open end of the vestibule to squarely engage the sides of the airplane around the door opening regardless of the angular relationship, within limits, of the longitudinal axis of the tunnel bridge with respect to the plane of the door.

When the ramp is inclined from the terminal to the aircraft so that the floor of the vestibule is not level, a tripping hazard is created at the aircraft door when the aircraft is positioned and oriented on the apron so that the vestibule must be rotated substantially from a straightline continuation of the ramp, as is described in U.S. Pat. No. 3,561,030 assigned to the assignee of the present invention. In that patent, the ramp is provided on its outer end with an enlarged articulated head which is mounted for limited pivotal movement about a transverse horizontal axis to maintain the floor horizontal at the outer end of the ramp, the vestibule is mounted for pivotal movement on this articulated head so that the vestibule floor remains level and the tripping hazard is avoided regardless of the orientation of the vestibule about its pivotal axis. However, mounting the horizontally swingable vestibule on the vertically pivotable articulated head has presented difficulties, and generally has required an excessively heavy, strong vestibule structure.

Movable vestibules of this type must be of sufficient size to completely encompass an aircraft door to provide freedom of movement of passengers therethrough. Also, movement of the loading ramp is normally controlled from an operator's booth on one side of the vestibule so that the operator has a clear view through a transparent windshield to enable the operator to swing the vestibule into position and to drive the movable end of the ramp into the desired loading position with respect to an aircraft door. Thus, the vestibules are necessarily both relatively large and heavy which, in combination with the live load to be carried, has presented problems in mounting the vestibule for such swinging movement.

In the past, it has generally been the practice to mount the movable vestibule on the outer end of a loading ramp by use of a combination of a fixed pivot support with a roller and track support located one at the top and the other at the bottom portion of the vestibule. For example, U.S. Pat. No. 3,412,412 discloses a loading ramp in which the top of the vestibule is pivotally supported by an elongated arm having one end rigidly mounted to the top wall of the movable vestibule and its other end pivotally supported on the fixed top wall of the outer end portion of the tunnel. The bottom portion of the vestibule is provided with a plurality of pairs of support rollers with each pair including a horizontally mounted roller engaging a first track to provide vertical support and a vertically mounted roller engaging a second track to provide lateral support. Such support requires that substantial loads be transferred through the sidewall structure of the vestibule so that relatively rigid, load bearing walls are required. The reverse of the general arrangement disclosed in U.S. Pat. No. 3,412,412 is also known, i.e., an arrangement whereby the bottom wall and frame structure is supported for rotation about a vertical pivot spaced rearward from the outer end of the ramp and the top wall and frame structure is supported by rollers engaging arcuate tracks, with the result again being that substantial loads must be transferred through the vestibule sidewall structure.

U.S. Pat. No. 3,315,291, assigned to the assignee of the present application, discloses a horizontally swingable vestibule structure including a relatively large structural platform assembly projecting rearwardly therefrom and supporting a substantial segment of the floor of the adjacent end portion of the passenger tunnel. The platform is pivoted for swinging movement about a vertical pivot shaft located near its centroid. This rearwardly projecting, generally arcuate portion of the platform overlies a portion of the frame of the tunnel and is supported by rollers engaging upwardly and downwardly directed surfaces to provide stability to the structure. Such an arrangement, however, does not readily lend itself to use in combination with an articulated head on the outer end of the ramp for maintaining the floor of the ramp horizontal at the area adjacent the aircraft door.

SUMMARY OF THE INVENTION

A primary object of the present invention is to provide an improved aircraft loading ramp of the type described and including an articulated head portion having an enlarged, generally arcuate, convex outer end portion and an aircraft vestibule having a substantially complementary, concave arcuate portion supported for pivotal movement around the convex outer end of the head, with improved mounting means supporting the vestibule through its bottom.

Another object of the invention is to provide such an improved aircraft loading ramp and vestibule structure including a horizontally extending support platform structure mounted for pivotal movement about the vertical pivot axis of the vestibule and including support rollers positioned at least adjacent each side edge of the passageway through the vestibule for engaging an upwardly directed surface on an arcuate track extending around the convex outer bottom wall of the head of the ramp to provide stable support for the pivotally mounted frame structure.

Another object of the invention is to provide such an aircraft loading ramp in which the side and top wall structure of the vestibule may be of relatively lightweight construction and in which the principle live and dead loads of the vestibule structure are carried by the bottom wall support thereof.

In the attainment of the foregoing and other objects and advantages, an important feature of the invention resides in providing an aircraft loading ramp having an articulated head on its outer, movable end supporting the horizontally swingable aircraft vestibule. The articulating head is mounted for limited pivotal movement about a horizontal axis to maintain its floor substantially horizontal despite vertical movement of the outer end of the ramp to accommodate aircraft of different heights. The top and bottom walls of the articulated head terminate in outwardly convex, arcuate edges, with at least a portion of the sidewalls being defined by flexible, rolled wall assemblies having one end mounted on and movable with the horizontally swingable aircraft vestibule to provide an enclosed passageway from the ramp through the articulated head and vestibule regardless of the rotative position of the vestibule.

The aircraft vestibule has top and bottom walls having arcuate edges complementary to and fitted adjacent the arcuate edges of the top and bottom walls, respectively, of the articulated head. A generally fan shaped structural platform has its apex pivotally supported on a vertical shaft extending downwardly from the bottom wall of the articulated head on the center of curvature of the top and bottom walls of the articulated head. The platform extends horizontally outward past the end of the articulated head and provides cantilevered support for the vestibule. An arcuate track extending around the bottom wall portion of the articulated head provides vertical support for rollers on the fan shaped platform. The spaced rollers and pivot shaft cooperate to provide a structurally strong, stable platform supporting the vestibule entirely from its bottom so that side and top walls of the vestibule may be of relatively lightweight construction. Suitable drive means such as a sprocket and chain drive connected between the vestibule and articulated head provide accurate, stable control of the rotative position of the vestibule about its vertical pivot axis. The position of the vestibule and of the ramp is controlled from an operator's station in the vestibule at one side of the passageway therethrough.

BRIEF DESCRIPTION OF THE DRAWINGS

The foregoing and other objects, features and advantages of the invention will become apparent from the detailed description contained hereinbelow, taken in conjunction with the drawings, in which:

FIG. 1 is a side elevation view of an aircraft loading ramp with an articulated head and vestibule embodying the present invention;

FIG. 5 is a fragmentary sectional view taken on line 5—5 of FIG. 4;

DESCRIPTION OF THE PREFERRED EMBODIMENTS

Figure 2:
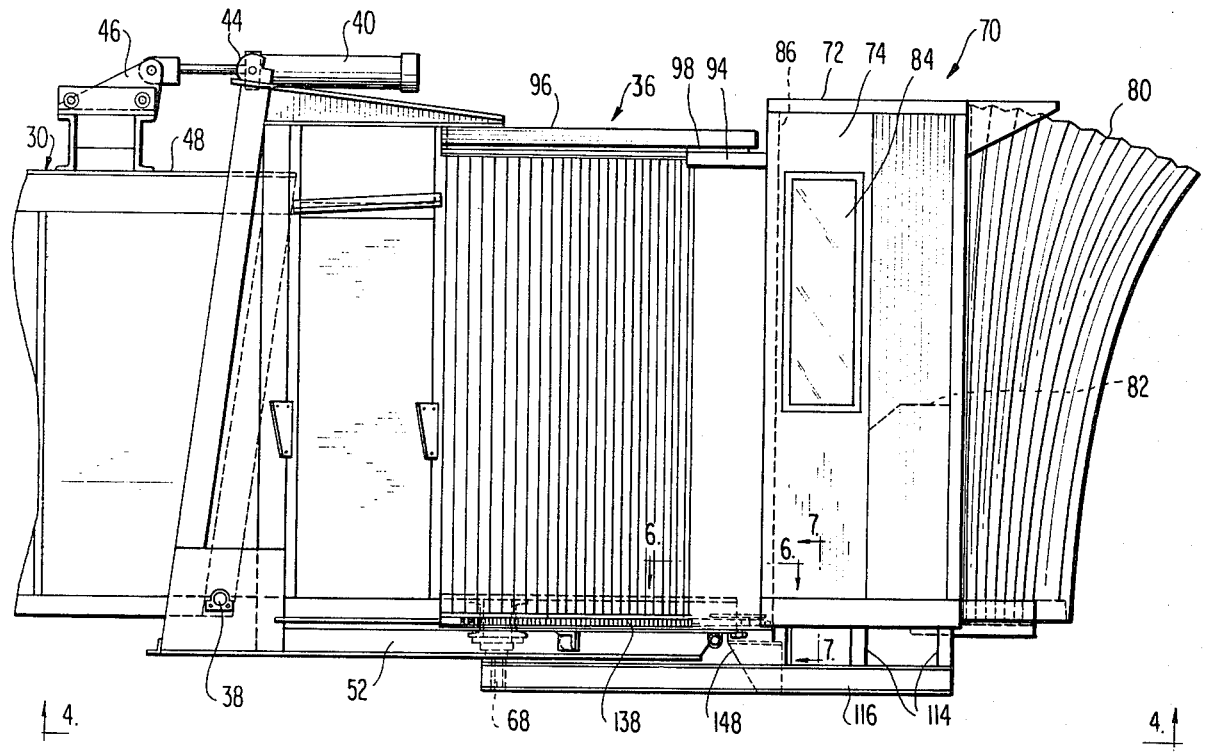
FIG. 2 is an enlarged elevation view, with certain parts omitted to more clearly illustrate other parts, of the articulated head and vestibule portion of the structure shown in FIG. 1.

A retractable and expandable aircraft loading ramp embodying the present invention is designated generally by the reference numeral 10 and is illustrated in FIG. 1 as extending between a terminal building 12 and an airplane 14 parked on an apron or paved area 16 adjacent the terminal. The inner, or terminal end of the ramp is supported by a pivotal mounting structure indicated generally at 18 including a pedestal 20 fixedly supporting a terminal vestibule 22. A rotatable platform 24 is mounted on pedestal 20 and supports a floor member (not shown) for the vestibule 22 and supports the inner end of the inner tunnel section 26 for limited pivotal movement about both horizontal and vertical axes. The pivotal support and terminal vestibule structure may be conventional in construction and therefore will not be described in greater detail here.

The major portion of the loading ramp is made up of the inner tunnel section 26, an intermediate tunnel section 28, and an outer tunnel section 30, with the tunnel sections being telescopingly received within one another and supported for simultaneous proportional telescoping movement to extend and retract along the longitudinal dimension of the loader. The outer end of the loader is supported by an elevator and undercarriage assembly, indicated generally at 32, enabling telescoping movement to extend and retract the ramp. Wheels 34 are steerable to enable the outer end of the ramp to be driven to and from a loading position relative to an aircraft parked on the apron.

The outer end of the outer tunnel section 30 terminates in an articulated head 36, which is mounted by shaft means 38 (FIG. 2) for limited pivotal movement about a horizontal axis extending transversely of the tunnel at the tunnel floor. A pair of hydraulic actuators 40, 42 have their cylinder ends pivotally connected to a bracket assembly 44 projecting upwardly from the top wall of the articulated head 36 and their piston ends pivotally connected to a rigid bracket assembly 46 mounted on and projecting upwardly from the top wall 48 of outer tunnel section 30. Fluid actuators 40, 42 are operable to pivot the articulated head about the pivot axis of the shaft means 38 to maintain the floor 50 of the articulated head in a horizontal position regardless of the elevated position of the outer end of the ramp 10.

Figure 3:
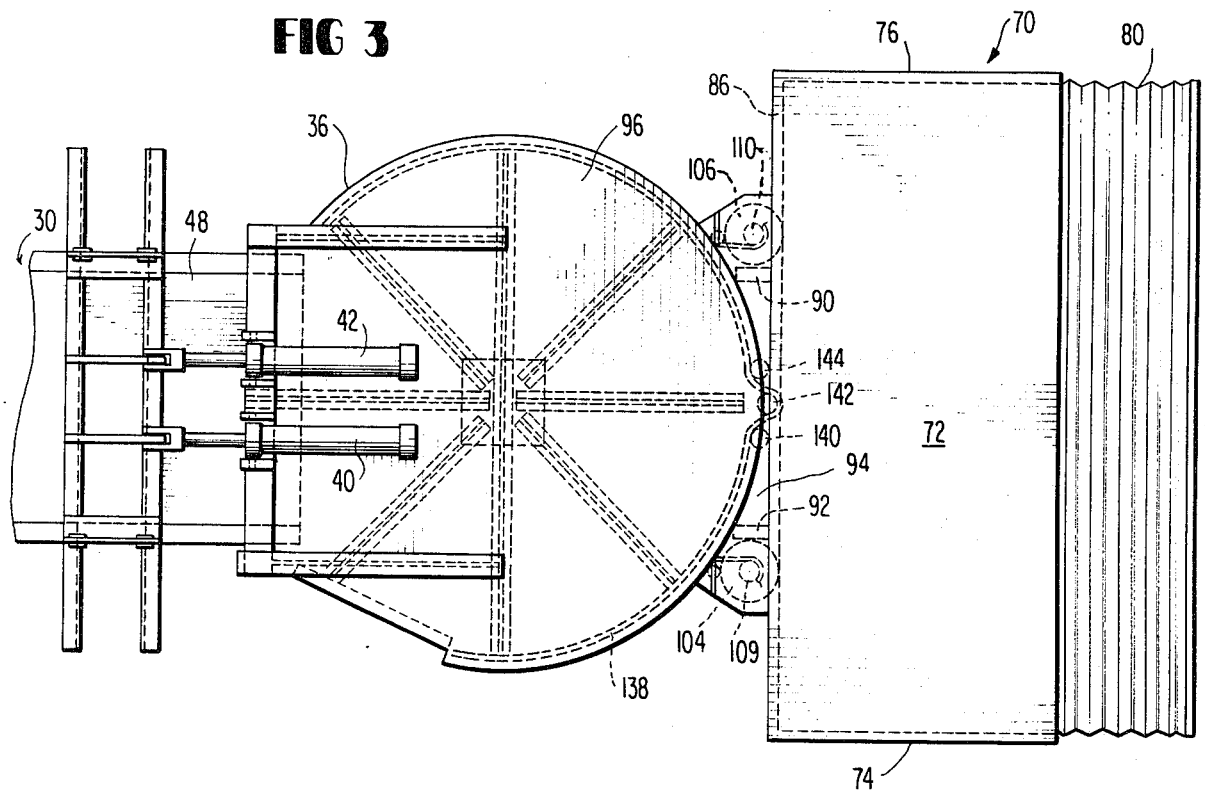
FIG. 3 is a top plan view of the structure shown in FIG. 2.
Figure 4:
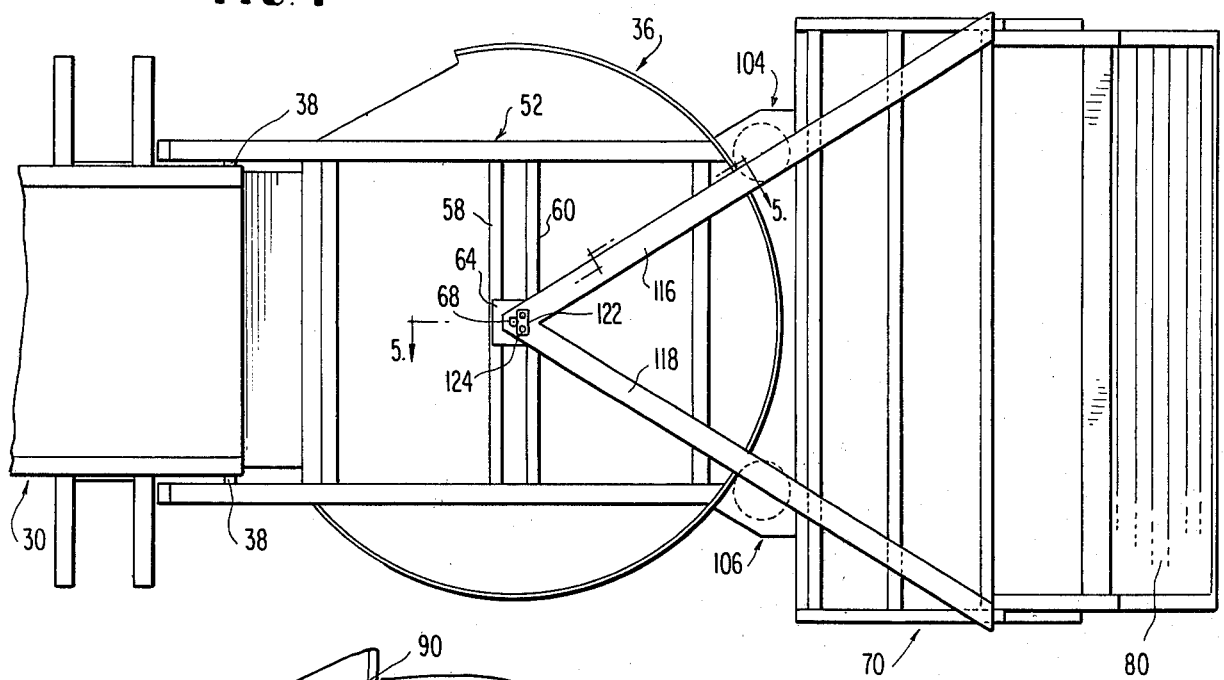
FIG. 4 is a bottom plan view of a portion of the structure shown in FIG. 2.

As most clearly seen in FIG. 3, the portion of the articulated head 36 which extends outwardly from the outer end of tunnel section 30 is substantially cylindrical, with its diameter being substantially greater than the transverse width of the tunnel section 30 to form a generally bulbous enlargement of the tunnel passageway. As illustrated in FIG. 1, the outer end of tunnel section 30 and the articulated head 36 project outwardly past the undercarriage assembly 32 so that the articulated head is supported in cantilevered fashion on the outer end of the tunnel. The center of curvature of the articulated head is located in the longitudinal vertical centerplane of the ramp.

As best seen in FIG. 5, the floor 50 of the articulated head is supported on a rigid welded frame structure indicated generally at 52 with the outer peripheral edge of this frame structure being defined by a vertical, arcuate plate 54 having its top edge 56 coplanar with the top surface of bottom wall floor 50. The top surface 56 defines an arcuate load bearing surface, or track, the purpose of which will be described below.

Frame 52 includes a pair of parallel structural channels 58, 60. A journal bearing 62 is rigidly mounted on the bottom flange of channels 58, 60, as by bearing plate 64 and bolts 66. A stub shaft 68 is journaled for rotation in bearing 62, with shaft 68 projecting downwardly below the bottom of frame 52.

An aircraft vestibule 70 (FIG. 2) is mounted on the articulated head 36 for pivotal movement throughout a relatively wide angle about the vertical axis of shaft 68 to accomodate aircraft parked on the apron on a relative wide range of headings. For example, in one embodiment of the invention, the aircraft vestibule is supported for pivotal movement to a position 30 degrees to the right and 95 degrees to the left of the longitudinal center line of the ramp for a total horizontal swinging movement through 125 degrees.

Vestibule 70 has a generally rectangular body portion defined by a top wall 72, opposed sidewalls 74, 76 and a bottom wall, or floor 78. The outwardly directed face of the vestibule is normally open, with foldable doors, not shown, being provided to close the open end when the apparatus is not in use. A flexible curtain hood 80 is mounted on the front face of the vestibule to provide a substantially weather-tight seal with the outer surface of an aircraft around a door therein. An operator's control console 82 is located in a control booth located at one side of the vestibule and a transparent window (not shown) in the control booth provides an unobstructed view of an aircraft as the ramp is being driven into position at the aircraft door. A second window 84 in the booth provides a view to the side of the ramp.

The back wall 86 of the vestibule 70 has a rectangular opening in its central portion to provide a passageway from the interior of the articulated head to the vestibule. The vestibule floor extends rearwardly from the rectangular opening and terminates in a rearwardly directed, concave, arcuate edge having a radius of curvature corresponding to that of the floor 50 of the articulated head, with the two curved edges being positioned in closely spaced relation to one another to provide a substantially continuous floor surface between the articulated head and the vestibule. A generally horizontal wall 94 extends rearwardly from the top of an upwardly projecting, arcuate sealing member 98 carried on the edge of wall 94 cooperating with a downwardly projecting, arcuate lip on the top wall of the articulated head to provide a weather seal. Vertical walls 100, 102 project rearwardly from the side edges of the rectangular opening 88 to complete the enclosure between the articulated head and the vestibule.

Figure 6:
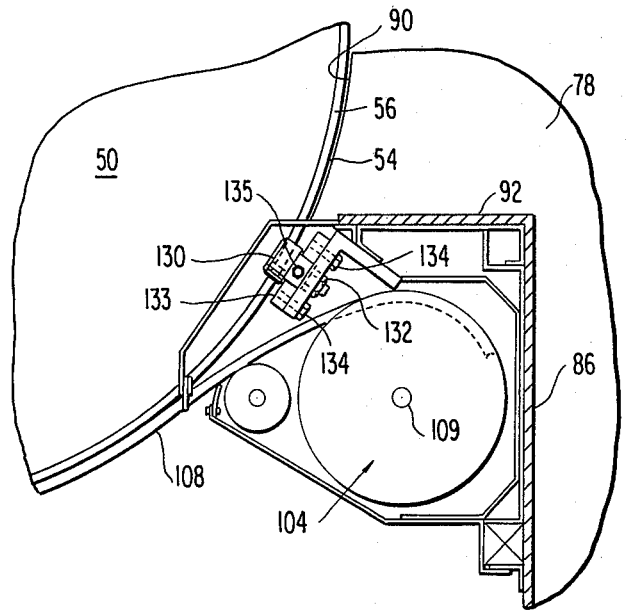
FIG. 6 is a fragmentary sectional view, on an enlarged scale, taken on line 6—6 of FIG. 2.
Figure 7:
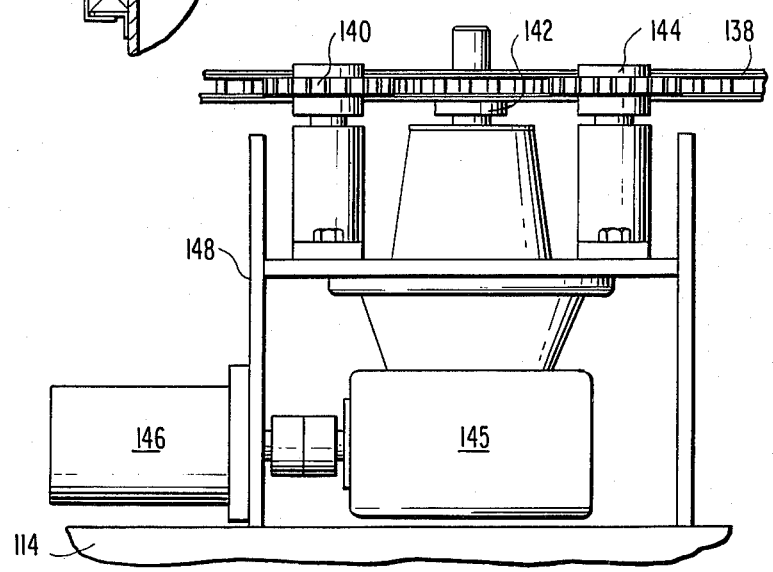
FIG. 7 is a fragmentary sectional view, on an enlarged scale, taken on line 7—7 of FIG. 2.

As previously indicated, the sides of the articulated head are closed by slatted, rollable curtain assemblies. Two such assemblies 104, 106 are provided and each includes an elongated flexible curtain member 108 having one vertical edge attached to the articulated head adjacent the end of the arcuate track surface 56. The flexible curtain members 108 extend around the arcuate edges of the articulated head to provide a generally arcuate sidewall defining an enclosure having a diameter substantially greater than the transverse width of the tunnel section 30. The other ends of the curtain members 108 are wound upon roller assemblies 109, 110, respectively, carried on the vestibule one adjacent to each of the vertical walls 90, 92, as best seen in FIGS. 3 and 6. The structure of the curtain assemblies, and the drive rollers therefore, is well known and will not be described in detail here other than to point out that, as the vestibule is swung horizontally about the radial center of the generally cylindrical articulated head, the roller assemblies pay out or take up the flexible curtain assemblies as required to extend or retract the sidewalls of the articulated head while providing a continuous open passage from the generally cylindrical articulated head into the vestibule.

Vestibule 70 is supported on a frame assembly including a plurality of floor joists 114 extending beneath and rigidly attached to the floor 78 of the vestibule. The joists 114 are rigidly mounted on the outer free ends of a pair of structural beams 116, 118 which extend rearwardly from the vestibule beneath the bottom frame 52 of the articulated head. Beams 116, 118 have their outer ends spaced apart a distance substantially equal to the width of the vestibule supported thereon, and extend inwardly beneath the articulated head in a converging relation and are rigidly joined at their inner end. A bearing sleeve 120 is rigidly joined to and extends downwardly through the inner joined end portions of the beams 116, 118 to receive the downwardly projecting end of shaft 68. Shaft 68 is retained against vertical movement in sleeve 120 by the locating tab 122 rigidly mounted, by a volt 124, on the bottom of the joined portion beams 116, 118.

A pair of rigid brackets are mounted one on the top surface of each of the beams 116, 118, with the brackets projecting upwardly above the level of the floor 50 of the articulted head. Only one of these rigid brackets, designated by the reference numeral 128, is shown in FIG. 5, the other such bracket being identical thereto. Thus, as shown in FIG. 5, each such bracket includes a roller 130 mounted for rotation about a horizontal axis with its outer, peripheral surface rolling on the top track surface 56 of the plate 54. Rollers 130 are each mounted on a shaft 131 retained by a nut 132 on a mounting plate 133 which, in turn, is mounted by bolts 134 on the bracket 128. Adjusting means such as the screw 135 is provided to accurately position the rollers 130 to align the floors 50 and 78.

Rollers 130 support the beams 116, 118 in position to place the floor 78 in substantially coplanar relation with the floor 50, and are spaced one outboard of each side of the opening 88 in the rear wall 86 and cooperate with the pivotal mounting of the shaft 68 and bearing sleeve 120 to provide a stable, thru-point support for the pivoted frame support of the vestibule. An outwardly extending stop 136 is provided on each of the rigid brackets in closely spaced relation to the lower edge of plate 54 to positively prevent lifting movement of the vestibule.

The floor joists 114 and the beams 116, 118 cooperate to define a generally fan-shaped platform providing cantilevered support for the vestibule 70 while permitting swinging movement about the vertical axis of the shaft 68 which corresponds to the arcuate center of the generally cylindrical articulated head. The combination of the roller support and pivot bearing provides for easy rolling movement to enable the vestibule to be swung horizontally about the vertical axis with minimum of effort. Additional roller supports may, of course, be provided, if desired.

The vestibule 70 is positioned about its pivot axis by an elongated chain 138 having its opposed ends rigidly attached to the articulated head adjacent the ends of the curved plate 54, with the length of chain 138 being slightly longer than the length of the curved plate. This excess length enables the chain to extend over a first idler sprocket 140 then around a driven sprocket 142 and a second idler sprocket 144 mounted for rotation about vertical axes on the vestibule. Sprocket 142 is driven through a gear reducer 145 by a suitable reversible motor, for example an electric or hydraulic motor, supported by bracket 148 mounted on the floor joists 114. The motor 146 is controlled by suitable means, not shown, from the operator's booth in the vestibule, and adjustable means are provided on the bracket 148 to adjust one of the idler sprockets to maintain the chain 138 under a predetermined tensile load to provide positive control and avoid undesired hunting or slack movement of the vestibule.

Since the vestibule 70 is supported entirely from its bottom wall, the vestibule itself may be of relatively lightweight construction. Thus, the side and top wall structure does not have to be so rigid as to be able to withstand the substantial reaction or moment loads encountered in mounting arrangements wherein the vestibule is supported at both the top and bottom portions. Further, since the vestibule support platform is supported from the rigid frame structure of the articulated head, the vestibule is automatically moved with the articulated head about its horizontal pivot axis to maintain the floors of both the vestibule and the articulate head level regardless of the angle of inclination of the remainder of the passageway as a result of vertical movement of the elevator mechanism.

The low-friction mounting of the platform, provided by the single vertical pivot and at least two laterally spaced rollers enables the vestibule to be easily moved about the pivot axis. Since the articulated head is normally maintained in a level condition, the vestibule is free to swing throughout the arcuate extent of the top surface of the support track 56. The horizontal pivot axis of the articulated head preferably extends through the plane of the floor, at the intersection of the articulating head and the outer tunnel section 30, so that limited pivotal movement of the articulated head and the vestibule about the horizontal axis does not cause a separation or overlapping of the adjacent floor surfaces, a condition which could cause a tripping hazard.

While I have disclosed and described preferred embodiments of my invention, I wish it to be understood that I do not intend to be restricted solely thereto, but rather that I do intend to include all embodiments thereof which would be apparent to one skilled in the art and which come within the spirit and scope of my invention.

I claim:

1. In a conveyance vehicle loading ramp of the type providing an elongated enclosed passageway extending from a terminal building to an outer end portion adapted to be moved both horizontally and vertically to position the outer end in communication with a door in a conveyance vehicle spaced from the terminal building, the ramp including an elongated generally rectangular tunnel section, an articulated generally cylindrical head having a diameter greater than the transverse dimension of the tunnel section mounted on the outer end of the rectangular tunnel section, and a vestibule mounted on the enlarged head for generally horizontal swinging movement therearound, the rectangular tunnel section, the articulated head and the vestibule having passages therethrough in communication with one another and cooperating to provide the enclosed passageway, the improvement comprising a floor in the articulated head having a generally arcuate outer peripheral edge portion and a generally horizontal structural frame extending beneath and supporting the floor, an arcuate track supported by the structural frame and extending adjacent to the peripheral edge portion of the floor of the articulated head, the arcuate track having an upwardly directed load bearing surface and having a common radial center with the generally arcuate peripheral edge portion of the floor of the articulated head, a generally horizontal platform mounted on the generally horizontal structural frame for movement about the articulated head, such platform including elongated, rigid arm means and a vestibule support portion projecting outwardly from the articulated head, such rigid arm means extending beneath and substantially parallel to the structural frame of the articulated head, pivot means pivotally connecting such elongated arms to the structural frame of the articulated head for limited movement about a generally vertical pivot axis containing the common radial centers of the arcuate portion of the floor of the enlarged head and of the arcuate track, roller means mounted on the generally horizontal platform and projecting upwardly therefrom, the roller means engaging the upwardly directed load bearing surface of the arcuate track and cooperating with the pivot means to provide vertical support for such platform, the roller means including at least two rollers positioned one on each side of the passageway extending through the vestibule, and means mounting the vestibule on the vestibule support for limited horizontal swinging movement therwith around the generally vertical pivot axis containing the common radial centers of the arcuate edge portion of the floor of the articulated head and of the arcuate track whereby the vestibule is substantially entirely bottom supported.

2. The invention according to claim 1 wherein the vestibule includes a floor having an arcuate concave rearwardly extending edge substantially complementary to the generally arcuate edge portion of the floor of the articulated head, the two floors being disposed in a coplanar relation and having their arcuate edges in juxtaposed relation to provide a substantially continuous floor surface between the enlarged head and the vestibule.

3. The invention according to claim 2 further comprising power means for moving the generally horizontal platform and the vestibule mounted thereon about the vertical axis containing the common radial centers of the arcuate edge portion of the floor of the articulated head, the support surface of the track, and of the arcuate edge of the floor of the vestibule.

4. The invention according to claim 3 wherein the power means comprises an elongated chain havings its opposed ends rigidly fixed on the articulated head adjacent the opposed ends of the generally arcuate track,
  reversible motor means mounted on the generally horizontal platform, and
  sprocket means driven by the reversible motor means and engaging the chain to drive the vestibule about the generally vertical pivot axis.

5. The invention according to claim 4 further comprising weather-seal means providing a weather seal between the vestibule and the articulated head, the weather-seal means including cooperating relatively movable components mounted on the vestibule and on the articulated head.

6. The invention according to claim 1 further comprising mounting means supporting the articulated head and the vestibule for limited pivotal movement about a horizontal axis extending transversely of the longitudinal axis of the elongated tunnel section, and
  power means for moving the articulated head and vestibule about such horizontal axis.

7. The invention according to claim 6 wherein such horizontal axis is contained in the plane of the floor of the articulated head.

8. The invention according to claim 6 wherein the vestibule includes a floor having an arcuate concave rearwardly extending edge substantially complementary to the generally arcuate edge portion of the floor of the articulated head, the two floors being disposed in a coplanar relation and having their arcuate edge in juxtaposed relation to provide a substantially continuous floor surface between the articulated head and the vestibule.

9. The invention according to claim 8 further comprising power means for moving the generally horizontal platform and the vestibule mounted thereon about the vertical axis containing the common radial centers of the arcuate edge portion of the floor of the articulated head, the support surface of the track, and of the arcuate edge of the floor of the vestibule.

10. The invention according to claim 9 wherein the power means comprises an elongated chain having its opposed ends rigidly fixed on the articulated head adjacent the opposed ends of the generally arcuate track,
  reversible motor means mounted on the generally horizontal platform, and
  sprocket means driven by the reversible motor means and engaging the chain to drive the vestibule about the generally vertical pivot axis.

* * * * *